United States Patent Office 3,567,477
Patented Mar. 2, 1971

3,567,477
MOLYBDATE ORANGE PIGMENT
James F. Higgins, Livingston, N.J., assignor to E. I. du Pont de Nemours and Company, Wilmington, Del.
No Drawing. Filed Nov. 15, 1967, Ser. No. 683,119
Int. Cl. C09c 1/20
U.S. Cl. 106—298    7 Claims

ABSTRACT OF THE DISCLOSURE

A high strength molybdate orange pigment, characterized by the typical X-ray diffraction pattern for molybdate orange and containing from 4 to 9 mol percent of lead molybdate, from 1 to 7 mol percent of lead sulfate and no more than 25 mol percent of monoclinic lead chromate, based on the total mols of lead salts present, prepared by introducing a chromate-molybdate-sulfate solution through a jet at a linear velocity of at least 48 ft./sec. into a stirred lead salt solution.

BACKGROUND OF THE INVENTION

The term "molybdate orange," as used herein, refers to the pigments identified by the Colour Index Number CI 77605 in the "Colour Index," second edition, 1956, published jointly by the Society of Dyers and Colourists, England, and the American Association of Textile Chemists and Colorists, United States. They range in color from a relatively light masstone, strong and yellow tint (small particle size) to a dark, red masstone and weak, red tint (relatively larger particle size). The tinctorial properties which make molybdate orange such a valuable and useful pigment are a consequence of the formation of a solid solution of lead chromate, lead molybdate, and, usually, lead sulfate, the solid solution having a well known characteristics X-ray diffraction pattern. None of the components by itself has the color properties of molybdate orange, and the presence in the pigment of any material not in solid solution alters the color from that of molybdate orange. Thus, "free" lead chromate, e.g., monoclinic lead chromate not in the desired solid solution, makes the pigment yellower; and "free" lead molybdate and lead sulfate, which are colorless, each dilutes the color and lowers tinting strength. Hence, for optimum quality, the pigment should consist essentially of the characteristic molybdate orange solid solution, with only such other materials present as are required to alter surface properties, dispersibility, lightfastness, and the like, in accordance with practices well known in the art.

The use of a small proportion of sulfate or other ion which forms an insoluble lead salt with the chromate and molybdate is conventional in the art to facilitate solid solution formation. The use of more than a minimum amount of sulfate or the like is undesirable since excessive amounts, estimated by Huckle et al. [Ind. Eng. Chem. 47, 1501–6 (1955)] at more than 10%, decrease tinting strength.

Past attempts to decrease the ingredient cost of molybdate orange pigment by decreasing the proportion of the expensive lead molybdate component have not been significantly successful. Such a decrease, following prior art procedures, leads to incomplete solid solution, with the attendant pigment deficiencies, unless the content of lead sulfate or other like insoluble lead salt is increased excessively, which, in turn, dilutes the color and decreases tinting strength. As a result, prior art molybdate orange pigments contain a minimum of about 10 mole percent lead molybdate.

THE PRIOR ART

Wagner et al. [Z. anorg. allgem. Chem. 208, 249–54 (1932)] were the first to recognize the distinctive X-ray diffraction pattern of molybdate orange which may be used to differentiate it from other chromate pigments. They ascribed to this compound the empirical formula $5PbCrO_4 \cdot 3PbMoO_4 \cdot 10PbSO_4$, i.e., a $PbMoO_4$ content of 16.7 mol percent.

Later Coffer et al. [Am. Ink Maker 25, No. 4, 35 (1947)] examined four commercial molybdate organes, found them to be essentially similar to each other in chemical composition, and concluded that the most satisfactory pigments correspond to the formula

$$27PbCrO_4 \cdot 4PbMoO_4 \cdot PbSO_4$$

i.e., a $PbMoO_4$ content of 12.5 mol percent. In their study of existing molybdate orange patents, they prepared a series of lead chromate-lead molybdate pigments containing from 5 to 30 mol percent $PbMoO_4$ in incremental steps. They concluded that maximum redness of product was realized at 10–12 mol percent $PbMoO_4$ content, and their analysis of commercial molybdate orange pigments showed all of them to be in this range.

Huckle et al. (ibid) examined 17 different commercial molybdate orange pigments, and found their chemical composition to fall in the range of 10–15 mol percent $PbMoO_4$ and 3–10 mol percent $PbSO_4$. They concluded that, though products could be made at higher molybdate or sulfate contents, they offer no advantage. At higher molybdate levels, there would be no improvement in quality to justify the increased cost, and at higher sulfate the lower tinting strength would be objectionable. They characterized molybdate orange and differentiated it from the crystalline forms of its individual chemical components by X-ray diffraction powder patterns and thus provided a basis for distinguishing these products from each other.

Bishop et al. [J. Chem. Eng. Data 6, 570–1 (1961)] studied the lead chromate-molybdate system by X-ray diffraction, and recognized a distinct phase of maximum redness at a composition corresponding to 10 mol percent $PbMoO_4$. The detailed X-ray diffraction data presented for their "90/10 phase" are sufficiently close to those for orthodox molybdate orange pigments to serve as a standard of reference for the latter.

was made to reduce the molybdate content to a minimum after World War II has been summarized by McBerty ["Molybdate Orange Pigment," FIAT Final Report No. 804, PB 22628, U.S. Dept. Commerce, Office of Technical Services, 1945]. This report indicates that an effort was made to reduce the molybdate content to a minimum but that such efforts were not promising. This work led to the conclusion that a minimum content of 10 mol percent $PbMoO_4$ was essential.

The early work on molybdate orange pigments is covered in a series of patents (U.S. 1,926,447, 2,030,009, 2,063,254, 2,157,712, 2,176,819) which encompass a range of compositions, as low as 2 mol percent $PbMoO_4$. At 5 mol percent $PbMoO_4$ the products obtained following the teachings of these patents are weak, dull, and yellow, showing no recognizable molybdate orange in their X-ray diffraction patterns, while at between 5 and 9.5 mol percent $PbMoO_4$, although some of the products do contain detectable molybdate orange, nevertheless, their content of contaminants showing the monoclinic $PbCrO_4$ lattice is so high as to render them of no practical commercial value or they are so diluted with lead sulfate as to be objectionably weak.

SUMMARY OF THE INVENTION

The present invention provides a high strength molybdate orange pigment, characterized by the typical X-ray diffraction pattern for molybdate orange and containing from 4 to 9 mol percent of lead molybdate, from 1 to 7 mol percent of lead sulfate and no more than 25 mol percent of monoclinic lead chromate. The pigment of the present invention is prepared by introducing a chromate-molybdate solution into a stirred lead salt solution through a jet of linear velocity of at least 48 ft./sec. At a lead molybdate content of approximately 9 mol percent or above, this technique permits the attainment of exceptionally high strength and a very desirable yellowish orange tint. At a lead molybdate content less than 9 mol percent, this procedure permits the preparation of standard quality molybdate orange pigment at a significantly reduced ingredient cost.

EXAMPLES

The following examples are cited to illustrate the invention. They are not intended to limit it in any manner. The term "parts" as used herein refers to parts by weight.

Example 1

Solution A is prepared by dissolving 123.0 parts of $Pb(NO_3)_2$ in 1250 parts of water, and the pH is adjusted to 4.0–4.1 at a temperature of 68±1° F. Solution B, containing a $CrO_4/MoO_4/SO_4$ mol ratio of 85.9/8.8/5.3, is prepared by dissolving 46.95 parts of $Na_2Cr_2O_7 \cdot 2H_2O$, 6.65 parts of $Na_2MoO_4$ and 2.75 parts of $Na_2SO_4$ in 1250 parts of water, and the pH is adjusted with dilute NaOH to 9.8–9.9 at a temperature of 68±1° F. To precipitate the pigment. Solution B is introduced under the surface of the rapidly stirred Solution A through a jet at a velocity of 90±2 ft./sec., and stirring of the resulting mixture is continued for 5 minutes after completion of the addition. Chloride ion concentration is adjusted to develop tint and strength in the conventional manner by adding a solution of 20 parts of NaCl in 250 parts of water to the mixture, following which the pH is adjusted to 2.5–2.6 with dilute HCl and stirring is continued for 9 minutes additional. The slurry is then neutralized with 3.5 parts of $Na_2CO_3$, and stirring is continued for a few minutes longer. The pigment is then silica coated by adding 7.2 parts of sodium silicate (23.2% $SiO_2$ $SiO_2/Na_2O$ ratio=3.54, such as Du Pont's technical grade 2×) dissolved in 40 parts of water to the mixture and stirring is continued for 5 minutes. An alumina coating is then applied by adding 8.9 parts of hydrated aluminum sulfate (equivalent to 56.0% $Al_2(SO_4)_3$, or 17.1% $Al_2O_3$) to the mixture. After an additional 5 minutes stir, the slurry is neutralized with a solution of 3.4 parts of $Na_2CO_3$ in 20 parts of water. The product is isolated in conventional manner by filtration, washing, and drying. The resulting pigment, containing 8.8 mol percent $PbMoO_4$ (exclusive of silica and alumina coating agents) shows a strength advantage of 18% in lithographic varnish by comparison with a counterpart prepared by a prior art procedure (Example 1 of of U.S. 2,813,039) and containing 11.3 mol percent $PbMoO_4$. By X-ray diffraction, the product of the invention is shown to contain 19% of monoclinic $PbCrO_4$.

A repetition of this example, but with mixing of Solutions B and A in the manner used in the prior art by adding Solution B to vigorously stirred Solution A, results in a very light yellowish pigment which contains over 26% monoclinic lead chromate, not in solid solution with lead molybdate. Tinctorially, the pigment more closely resembles a chrome yellow than a molybdate orange.

Example 2

Solution A is prepared by dissolving 122.85 parts of $Pb(NO_3)_2$ in 2000 parts of water and adjusting the pH to 3.0–3.1 at a temperature of 68±1° F. Solution B, containing a $CrO_4/MoO_4/SO_4$ mol ratio of 89.3/4.2/6.5, is prepared by dissolving 48.35 parts of $Na_2Cr_2O_7 \cdot 2H_2O$ 3.1 parts of $Na_2MoO_4$ and 3.35 parts of $Na_2SO_4$ in water containing 0.5 part of hydrochloric acid (36% HCl), and diluting the resulting solution to a volume equivalent to 2000 parts of water. To precipitate the pigment, Solution B is introduced under the surface of the rapidly stirred Solution A through a jet at a velocity of 90±2 ft./sec., the addition being conducted in three equal parts at one minute intervals. Tint and dry strength are developed by stirring for three additional minutes, following which a solution of 25 parts of NaCl in 250 parts of water is added, the pH is adjusted to 2.6±0.1, and stirring is continued for another 15 minutes. A solution of 3.8 parts of $Na_2CO_3$ in 20 parts of water is then added, and stirring is continued for an additional 5 minutes. At this point, the stirred slurry is treated as described in Example 1 to apply silica and alumina coatings successively with (1) a solution of 7.5 parts of sodium silicate in 90 parts of water and is stirred 5 minutes and (2) with a solution of 90 parts of hydrated aluminum sulfate dissolved in 75 parts of water and is stirred 5 minutes. Then a solution of 7.5 parts of $Na_2CO_3$ in 40 parts of water is added and the mixture is stirred 2 minutes, and finally 1.89 parts of $SbCl_3$ is added, following which stirring is continued for 10 minutes longer.

The product, isolated in the conventional manner, is a dark masstone type of molybdate orange. The X-ray diffraction pattern shows the typical peaks characteristic of molybdate orange and shows no evidence of more than 20% of monoclinic lead chromate. This product contains 4.2 mol percent $PbMoO_4$ exclusive of silica and alumina coating agents; i.e., less than half the amount normally found in standard molybdate orange pigments.

Repetitions of this example following prior art procedures for mixing Solutions A and B result in extremely yellow pigments outside the molybdate orange tinctorial range, which contain a very large proportion of free monoclinic lead chromate.

EFFECT OF JET VELOCITY

While the velocity at which the $CrO_4/MoO_4/SO_4$ solution is jetted into the precipitating lead salt solution may vary over a wide range and still produce the products of the present invention, it is necessary that a jet velocity of at least about 48 ft./sec. be used. In general, production of products with lower lead molybdate content requires the use of higher jet velocities. Thus, when jet velocity is decreased at constant lead molybdate levels and otherwise equivalent conditions, tinting strength is lowered. This is demonstrated in the results reported in Table I below where the technique of Example 1 is followed to produce a series of products at lead molybdate levels and jet velocities indicated. In each run, a concentration of 0.34 gram mols per liter of reactants, on the basis of lead ion content, is used. The products are compared by rubout in lithographic varnish with a standard containing 11.3 mol percent of lead molybdate and made by the process of Example I of U.S. 2,813,039.

TABLE I

| Example: | Mol percent $PbMoO_4$ [1] | Jet velocity (ft./sec.) | Observation [2] |
|---|---|---|---|
| 3 | 8.3 | 64 | Equal. |
| 4 | 8.3 | 49 | Do. |
| 5 | 8.3 | 40 | Weaker. |
| 6 | 7.4 | 90 | Slightly Stronger. |
| 7 | 7.4 | 64 | Equal, slightly redder. |
| 8 | 7.4 | 54 | Weaker. |

[1] Based on total lead salts.
[2] Comparison of product with standard.

Similarly, when jet velocity is maintained constant and the lead molybdate level is decreased, tinting strength is lowered. This is demonstrated in Table II wherein a jet velocity of 90 ft./sec. is employed in each run (using the technique of Example 1) and the concentration of reactants is maintained at 0.29 gram mols per liter. For evaluation purposes, comparison is again made with the standard using the product masstone ink extended with zinc oxide.

TABLE II

| Example: | Mol percent PbMoO₄ [1] | Observation [2] |
|---|---|---|
| 9 | 14.8 | Much stronger, yellower. |
| 10 | 10.8 | Stronger, yellower. |
| 11 | 9.3 | 18% stronger. |
| 12 | 8.3 | 10% stronger, slightly yellower. |
| 13 | 7.4 | Equal, redder. |
| 14 | 6.3 | Equal. |

[1] Based on total lead salts.
[2] Comparison of product with standard.

Jet velocities from about 48 to about 100 ft./second are adequate for preparing the product of the present invention. Higher velocities, up to 125 ft./sec. and higher may be used but are generally unnecessary. It is preferred to use a jet velocity of at least about 60 ft./sec.

LEAD SULFATE CONTENT

While the lead sulfate content of the pigment of the present invention may vary, the tinting strength of the product decreases as concentration of sulfate increases. The product of the present invention, a molybdate orange of excellent quality, has a lead sulfate content no greater than about 7 mol percent. In general, this limit has been observed to preclude production of the product of the present invention by prior art processes, since use of low concentrations of lead molybdate is generally accompanied by fromation of "free" (i.e., not in solid solution with bolybdate) monoclinic lead chromate which is conventionally minimized by adding sulfate or other ion to facilitate solid solution formation. Thus, when an attempt is made, following the technique of the first example of U.S. 2,176,819 (Linz et al.), to produce a pigment of low ingredient cost by decreasing the molar proportion of molybdate to 5.8% (mol ratio $$CrO_4/MoO_4/SO_4 = 82.2/5.8/12.0$$

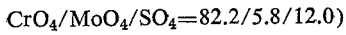

a very weak, excessively yellow pigment is obtained which contains a very large proportion of monoclinic lead chromate, i.e., above 25 mol percent, not in solid solution with the lead molybdate. While it is possible, following this procedure, to obtain a molybdate orange pigment at 9.0 mole percent molybdate with use of a large amount of sulfate (i.e., a $CrO_4/MoO_4/SO_4$ ratio of 83.0/9.0/8.0), on decreasing the sulfate content below 8.0%, very yellow dull pigments containing much free lead chromate and totally unacceptable as molybdate orange, are obtained, as noted in Table III.

TABLE III

| Example: | Mol ratio CrO₄/MoO₄/SO₄ | Tinctorial observation | Mol percent free PbCrO₄ |
|---|---|---|---|
| 15 | 77.0/11.0/12.0 | Dull, yellowish | Ca. 25 |
| 16 | 83.0/9.0/8.0 | Molydbate orange | −25 |
| 17 [1] | 85.0/9.0/6.0 | Very dull, light | ++25 |
| 18 [1] | 82.2/5.8/12.0 | ___do___ | ++25 |

[1] No acceptable as molybdate orange.

By contrast, as demonstrated in Example 2 above, the process of the present invention is capable of producing molybdate orange of high quality at a lead molybdate level of 4 mol percent having a sulfate level of 7 mol percent. A small quantity of sulfate, approximately 1 mol percent, is used in production of molybdate orange pigment of standard quality by the process of this invention.

PROCESS VARIABLES

The concentrations of the reactant solutions employed to form the pigment may be varied over a considerable range from approximately 0.2 gram mols per liter to 0.6 gram mols per liter, with a range of 0.25–0.55 preferred. Lower concentrations are economically unattractive, since they decrease the rate of production. At higher concentrations, the preparation of a standard product of uniform tinctorial properties is more difficult.

The concentration of the chloride ion in the development step is adjusted to attain the desired degree of redness or yellowness of tint and strength. Generally, the concentration of chloride ion is maintained at approximately the same value regardless of changes in concentration of the reactant solutions.

Considerable latitude is permissible in the conditions employed for the precipitation of the molybdate orange. The duration of this step may be varied over a range from approximately 10 seconds to several minutes on a laboratory scale. The precipitation may be adapted to continuous operation, or it may be carried out in incremental steps with appropriate stirring times between each addition of reactants. In the later case, the increments need not be proportional to the time intervals.

The elapsed time between completion of the precipitation and the beginning of the development step will affect the hue of the product obtained and it is therefore controlled in accordance with conventional procedures.

Although the examples show precipitation only at a temperature of 68±1° F., the process is readily operable in a range from 60 to 80° F., with 65–75° F. preferred.

The pH of the solutions during the precipitation and in the subsequent development steps is controlled depending upon the product desired. The normal range of permissible pH during the precipitation reactions is 1.5–4.5 and in the subsequent development step 2.0–3.5.

It is convenient to use a slight excess of soluble lead salts over the theoretical requirement. In general, this should not be less than 2% above the stoichiometric amount. Larger quantities are permissible, but they serve no useful purpose, since the excess is precipitated as insoluble salts in the subsequent treatments and thus results in a weaker product.

Although the examples have been restricted to lead nitrate as the source of lead ion, nevertheless, other soluble lead salts may be substituted therefor. Of these, lead acetate is the only one which has been used to any significant extent in commercial practice. However, it should be understood that this invention is in no way limited by the choice of lead salt, other than to specify that it must be soluble in water.

ADVANTAGES OF THE INVENTION

This invention permits the preparation of novel molybdate orange pigments of standard quality, as evidenced both by their tinctorial attributes and X-ray diffraction pattern, at a much lower $PbMoO_4$ content than has heretofore been possible. Such reduction in molybdate usage results in significant economy, without any deterioration in properties of the resulting pigment. The invention is useful in preparing all classes of molybdate pigments, including those of reddish hue as well as the yellow type.

Many equivalent modifications of the present invention will become apparent to those skilled in the art from a reading of the above without a departure from the inventive concept.

What is claimed is:

1. An orange pigment characterized by the typical X-ray diffraction pattern for molybdate orange and containing from 4 to 9 mol percent of lead molybdate, from 1 to 7 mol percent of lead sulfate and the remainder lead chromate, wherein no more than 25 mol percent of monoclinic lead chromate is present.

2. The pigment of claim 1 having a ratio of $PbCrO_4/PbMoO_4/PbSO_4$ of 85.9/8.8/5.3.

3. The pigment of claim 1 having a ratio of $PbCrO_4/PbMoO_4/PbSO_4$ of 89.3/4.2/6.5.

4. A process for producing an orange pigment characterized by the typical X-ray diffraction pattern for molybdate orange and containing from 4 to 9 mol percent of lead molybdate, from 1 to 7 mol percent of lead sulfate and the remainder lead chromate, and wherein no more than 25 mol percent of monoclinic lead chromate is present, comprising jetting a first salt solution containing 4 to 9 mol percent $MoO_4$, 1 to 7 mol percent sulfate and the remainder chromate into a stirred lead salt solution at a linear jet velocity of at least 48 feet per second, precipitating an orange pigment, isolating the orange pigment, and recovering the orange pigment containing no more than 25 mol percent of monoclinic lead chromate.

5. The process of claim 4 wherein the first salt solution is jetted into the stirred salt solution under the surface of the lead salt solution.

6. The pigment of claim 1 wherein the mol percent of lead molybdate is from 4 to 7.4 mol percent.

7. The process of claim 4 wherein said first salt solution contains 4 to 7.4 mol percent $MoO_4$, said linear jet velocity is at least 60 feet per second and said pigment contains from 4 to 7.4 mol percent of lead molybdate.

References Cited
UNITED STATES PATENTS

| | | | |
|---|---|---|---|
| 1,926,447 | 9/1933 | Lederle et al. | 106—298 |
| 2,176,819 | 10/1939 | Linz et al. | 106—298 |

JAMES E. POER, Primary Examiner